Dec. 31, 1935.　　　G. L. ROSEBROOK　　　2,025,780
WHEEL SCRUBBING APPARATUS
Filed Dec. 12, 1931　　　8 Sheets-Sheet 1
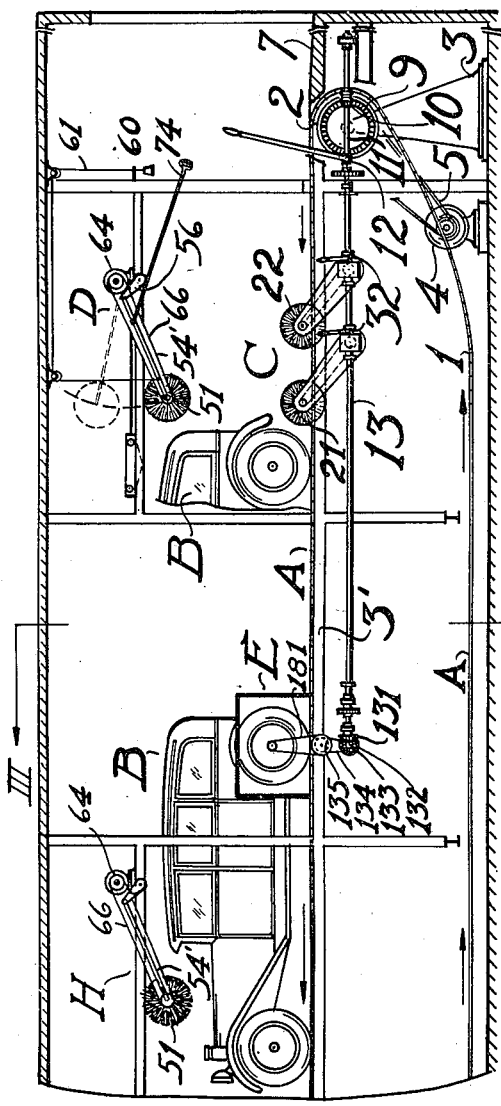
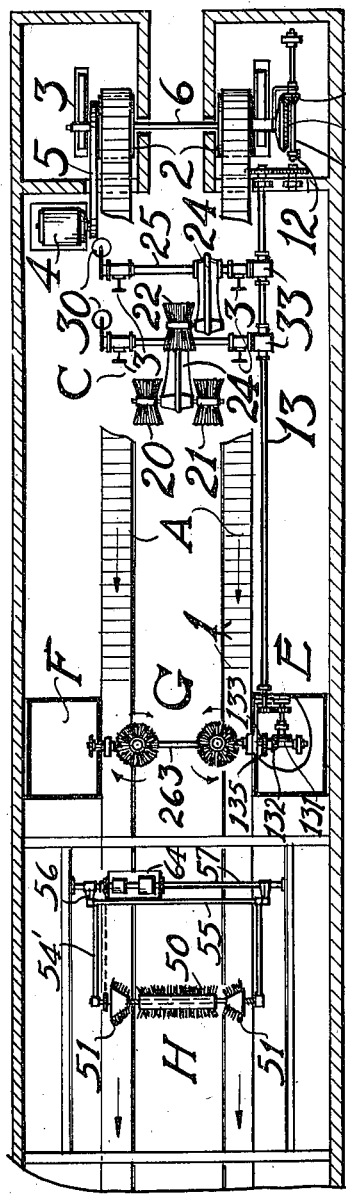
Inventor
Guy Lynn Rosebrook
By
W. E. Currie Attorney

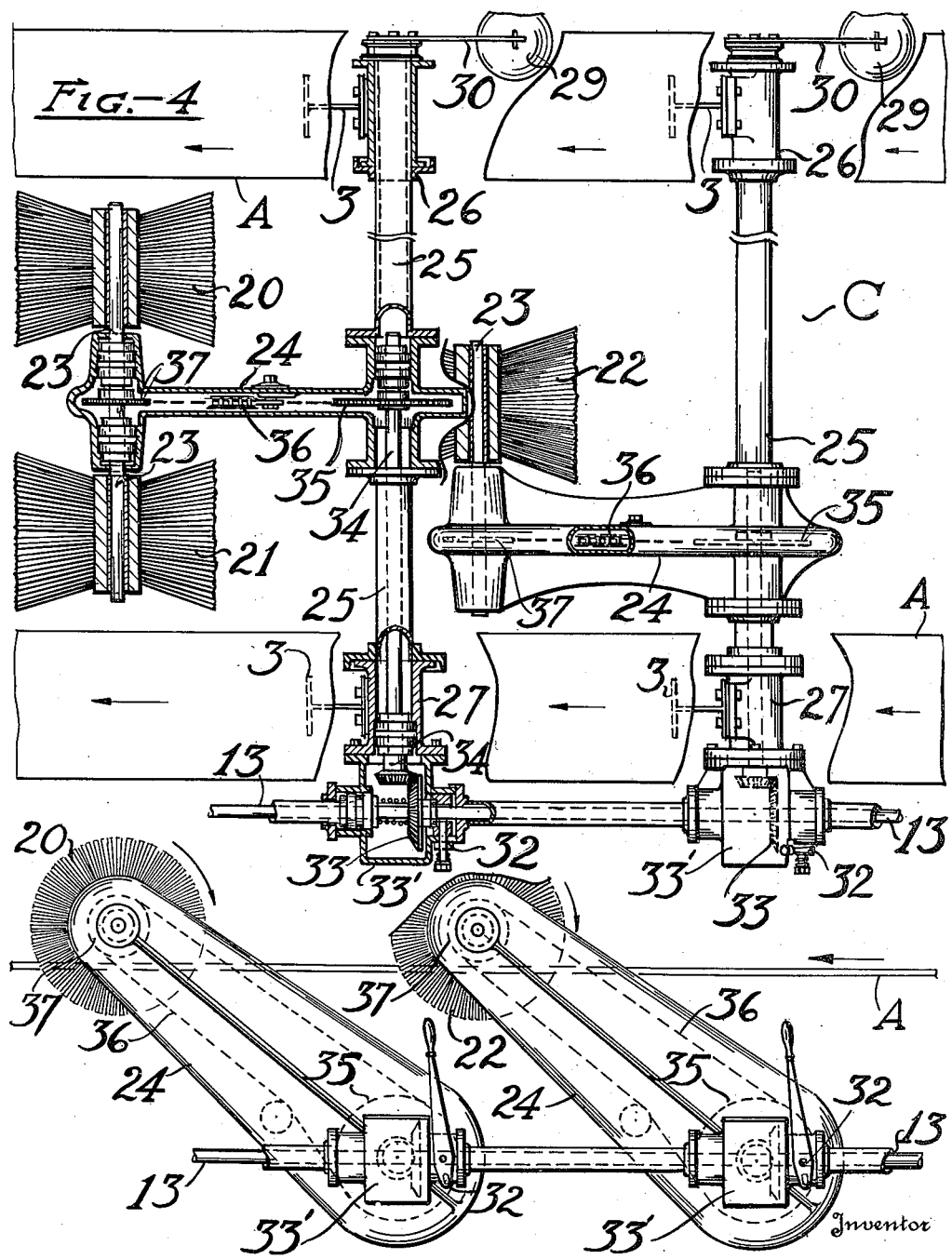

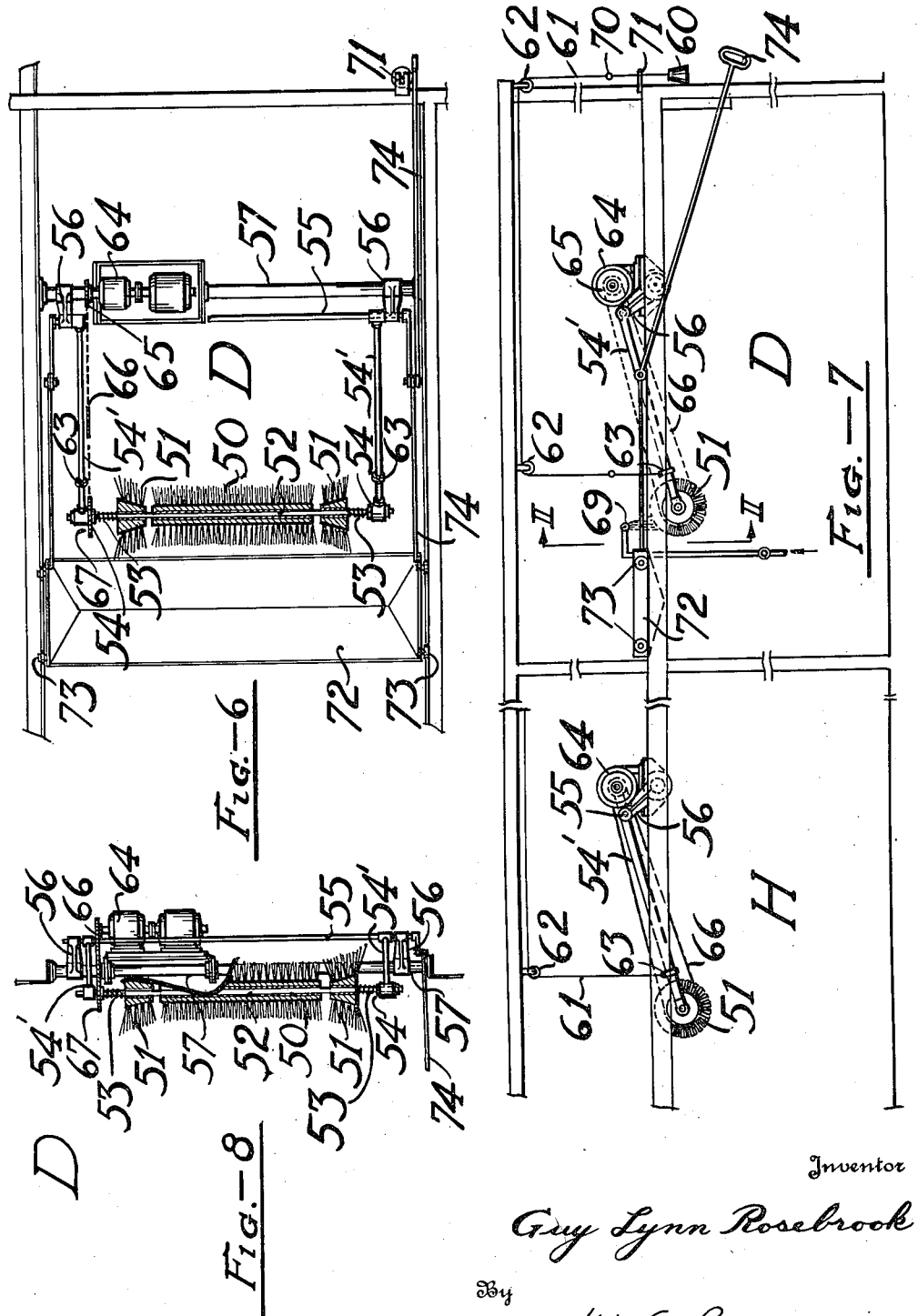

Dec. 31, 1935. G. L. ROSEBROOK 2,025,780
WHEEL SCRUBBING APPARATUS
Filed Dec. 12, 1931  8 Sheets-Sheet 4

Inventor
Guy Lynn Rosebrook
By
W. E. Currie, Attorney

Dec. 31, 1935.  G. L. ROSEBROOK  2,025,780
WHEEL SCRUBBING APPARATUS
Filed Dec. 12, 1931    8 Sheets-Sheet 5
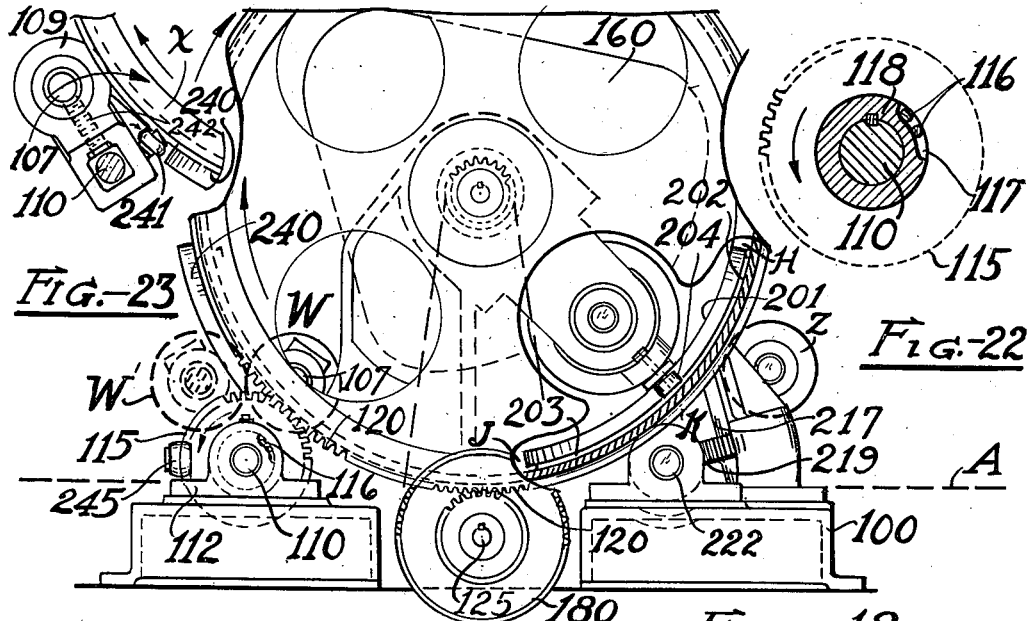
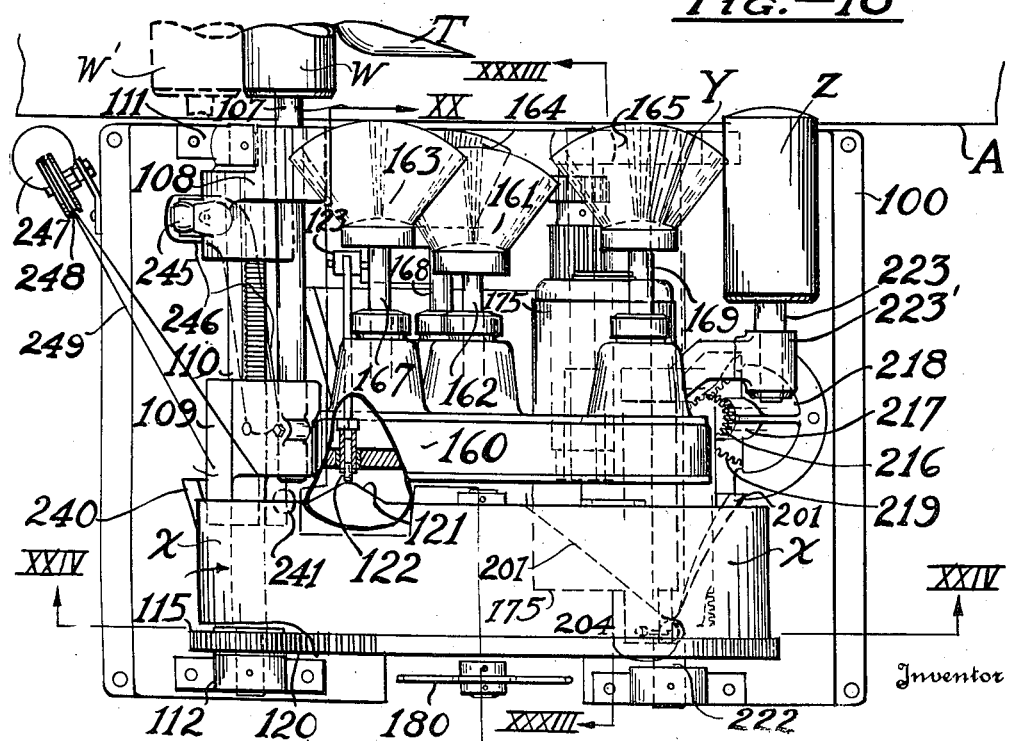

Dec. 31, 1935.  G. L. ROSEBROOK  2,025,780
WHEEL SCRUBBING APPARATUS
Filed Dec. 12, 1931  8 Sheets-Sheet 6
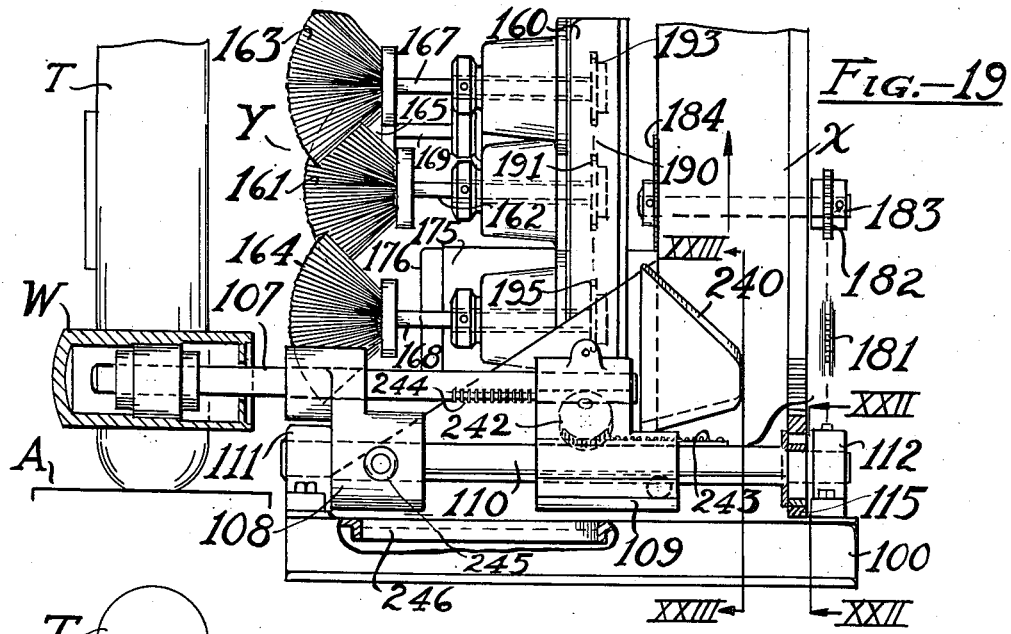
Fig.-19
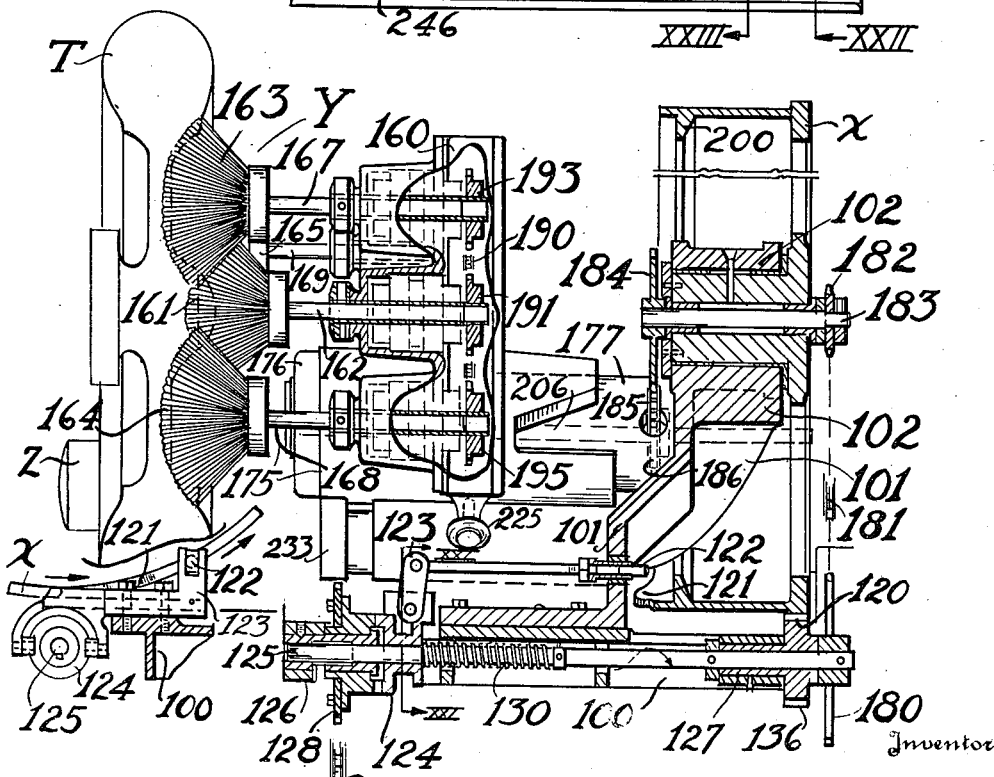
Fig.-21
Fig.-20
Inventor
Guy Lynn Rosebrook
By
W. E. Currie Attorney Dec. 31, 1935.  G. L. ROSEBROOK  2,025,780
WHEEL SCRUBBING APPARATUS
Filed Dec. 12, 1931  8 Sheets-Sheet 7
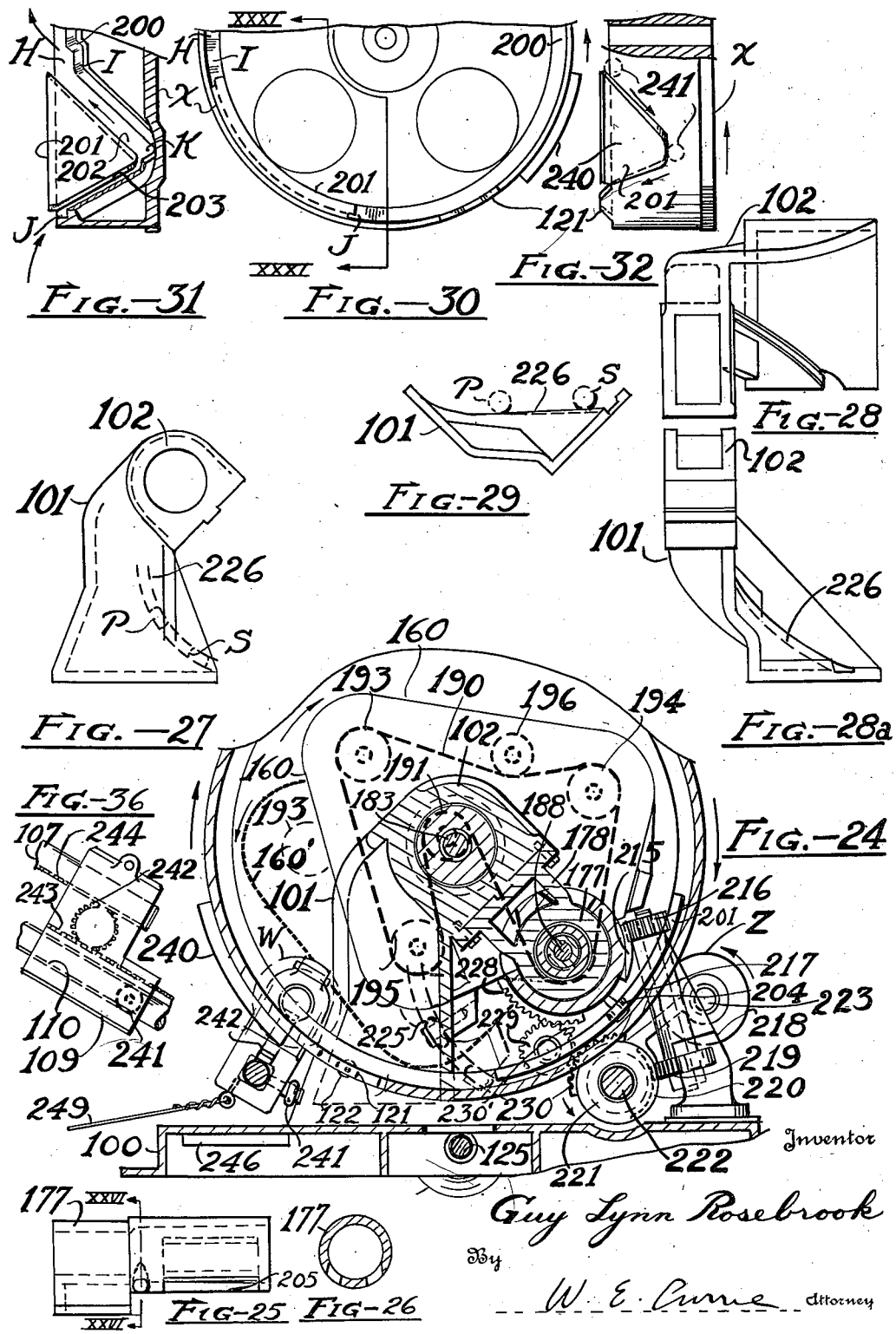

Dec. 31, 1935.   G. L. ROSEBROOK   2,025,780
WHEEL SCRUBBING APPARATUS
Filed Dec. 12, 1931   8 Sheets-Sheet 8
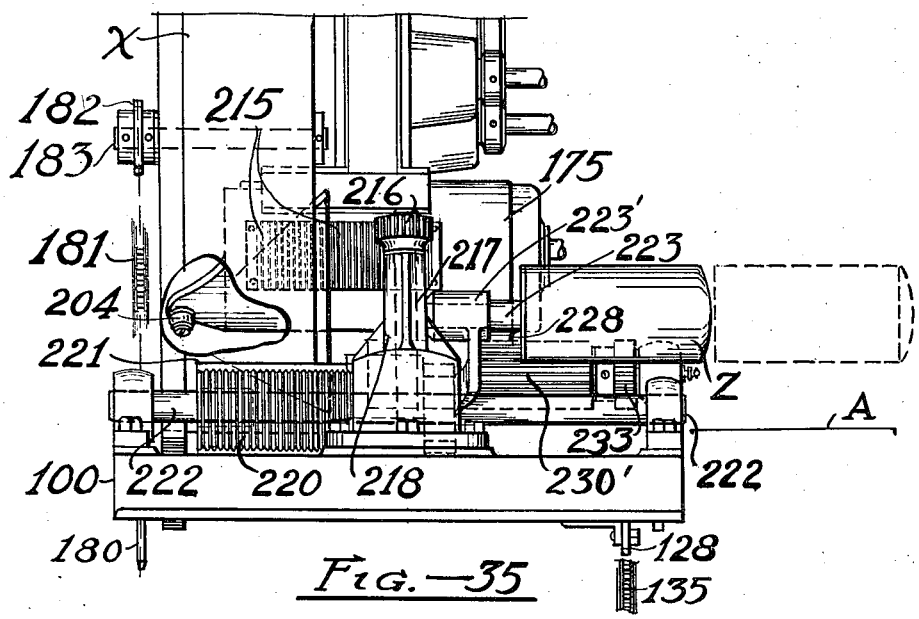
Fig.—35
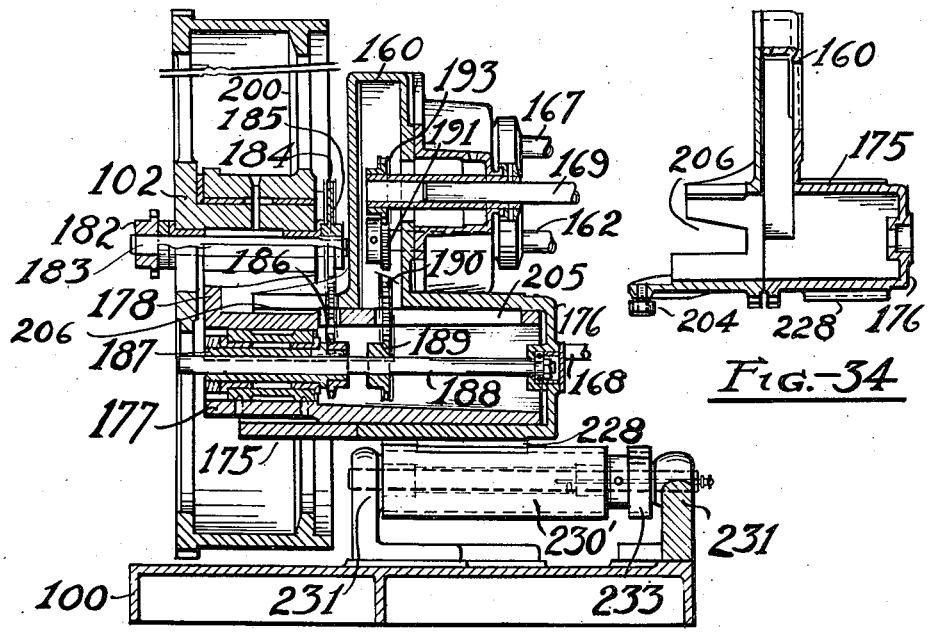
Fig.—34
Fig.—33
Inventor
Guy Lynn Rosebrook
By
W. E. Currie, Attorney Patented Dec. 31, 1935

2,025,780

UNITED STATES PATENT OFFICE 2,025,780

WHEEL SCRUBBING APPARATUS

Guy Lynn Rosebrook, Cranbury Lake, N. J., assignor to Standard Oil Development Company, a corporation of Delaware Application December 12, 1931, Serial No. 580,529

11 Claims. (Cl. 15—21)

This invention relates to improvements in the cleaning of vehicles. More particularly it relates to an improved method and apparatus for washing automotive vehicles.

It is an object of this invention to mechanically brush and wash the chassis of a vehicle;

It is a further object to devise an improved apparatus for cleaning the wheels of a vehicle;

Another object is to mechanically wash and dry the top of a vehicle;

Still another object is to clean a vehicle by a combination of manual and mechanical cleaning steps;

A further object is to clean the top and the under surfaces of a vehicle mechanically.

Other objects will be apparent from the specification and from the accompanying drawings in which latter:

Fig. 1 is a top plan view of the device with parts broken away;

Fig. 2 is a side elevational view of the device showing an automobile in process of being cleaned;

Fig. 3 is a transverse sectional view taken along the line III—III of Fig. 2;

Fig. 4 is a top plan view on an enlarged scale with parts broken away of the chassis cleaning mechanism;

Fig. 5 is a side elevational view of the chassis cleaning mechanism;

Fig. 6 is a top plan view of the top cleaning mechanism;

Fig. 7 is a side elevational view of the top cleaning mechanism and the top drying mechanism;

Fig. 8 is an end elevational view with parts broken away of the top cleaning mechanism;

Figure 9:
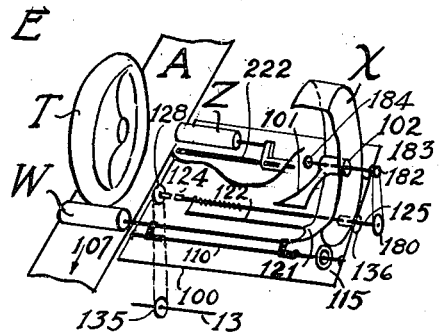

Figs. 9 to 16 inclusive are diagrammatic views in perspective with parts broken away of the outside wheel washing mechanism, showing step by step the successive positions of the parts of the mechanism during the operation of washing a vehicle wheel;

Fig. 17 is a top plan view with parts broken away of the outside wheel washing mechanism and showing the brushes in withdrawn position and a vehicle wheel in position to engage the mechanism;

Fig. 18 is an end elevational view of the outside wheel washing mechanism as viewed from the bottom of Fig. 17 with parts broken away;

Fig. 19 is a side elevational view of the outside wheel washing mechanism as viewed from the left of Fig. 17 showing the brush unit in retracted position and with respect to the vehicle wheel;

Fig. 20 is a longitudinal sectional view taken along the line XX—XX of Fig. 17, and showing the brush unit in its outer position against the vehicle wheel;

Fig. 21 is a transverse sectional view taken along the line XXI—XXI of Fig. 20;

Fig. 22 is a transverse sectional view taken along the line XXII—XXII of Fig. 19;

Fig. 23 is a transverse sectional view taken along the line XXIII—XXIII of Fig. 19;

Fig. 24 is a transverse sectional view taken along the line XXIV—XXIV of Fig. 17;

Fig. 25 is a detailed side elevational view of the tubular brush housing arm;

Fig. 26 is a transverse sectional view taken along the line XXVI—XXVI of Fig. 25;

Fig. 27 is a detailed side elevational view of the supporting bracket for the cylindrical cam drum;

Fig. 28 is a top plan view of the supporting bracket;

Fig. 28a is a side view of the supporting bracket;

Fig. 29 is a perspective view of the supporting bracket;

Fig. 30 is a detailed view on an enlarged scale of the cylindrical cam drum X showing the portion of the camway for forwarding and retracting the brush unit;

Fig. 31 is a transverse sectional view through the cylindrical cam drum X taken along the line XXXI—XXXI of Fig. 30;

Fig. 32 is a longitudinal sectional view through a portion of the cylindrical cam drum X showing the camway for withdrawing the stop roller mechanism;

Fig. 33 is a longitudinal sectional view through the outside wheel washing mechanism taken along the line XXXIII—XXXIII of Fig. 17;

Fig. 34 is a longitudinal sectional view of the tubular hub of the brush spindle housing;

Fig. 35 is a side elevational view with parts broken away of the outside wheel washing mechanism as viewed from the right in Fig. 17; and Fig. 36 is a side elevational detail view of the slide bracket and associated parts.

Referring to the drawings and particularly Figs. 1, 2 and 3, reference letter A designates an endless belt conveyor which is adapted to carry a vehicle such as a car or automobile B into position to be subjected to the cleaning operations. The chassis of the vehicle is subjected to the cleaning action of a rotary brush unit C saturated with cleaning solution as the vehicle is carried on by the conveyor. Similarly the top of the vehicle is subjected to the cleaning action of a rotary brush unit D. Upon further travel of the vehicle B with the conveyor, the forward movement of the vehicle B with respect to the conveyor is intermittently stopped to permit the front and rear wheels of the vehicle to be successively engaged and washed by the brush units E and F which engage the exterior of the wheels, and by the brush units G which engage the inner surface of the wheels. Preferably all of the foregoing brush units are saturated with cleaning solution. The cleaning is accomplished by contact of the brush bristles with the vehicle surfaces and by the pressure spray of the cleaning solution. Further travel of the vehicle B with the conveyor brings the vehicle into contact with a brush unit H for drying the top of the vehicle. The vehicle is then delivered from the conveyor to a suitable place of disposal not shown.

Referring particularly to Figs. 1, 2 and 3, the conveyor A includes the spaced members or sections 1 which are suitably supported on rollers 2 in a framework 3. The rollers are driven in rotation by means of a motor 4 through a belt 5 the power being transmitted to a main sprocket shaft 6. A runway 7 leads to the conveyor. The sprocket shaft 6 is provided with a beveled gear 9 through which power is transmitted to a spur gear 10, mounted on a shaft 11. Shaft 11 has operative connection through a clutch device 12 with a driving shaft 13.

Chassis cleaning mechanism "C"

Travel of the vehicle with the conveyor A brings the chassis or under surface of the vehicle B between the vehicle wheels into position to be brushed and washed by the brushes of the chassis cleaning mechanism C. This mechanism, see Figs. 1, 2, 4 and 5, comprises brushes 20 and 21 mounted as one unit and brushes 22 mounted in a second unit. Brush 22 is positioned approximately on the center line of the chassis and functions to clean the oil pan, clutch housing, gear case, drive shaft, differential housing, and under side of the gas tank of the automobile. Brushes 20 and 21 are positioned on opposite sides of the center line of the chassis overlapping the brush 22 and function to clean the front and rear axles, springs, shackles and the like, muffler, battery case and under side of the gas tank and certain portions of the frame of the vehicle. Brushes 20 and 21 are rotatably mounted upon a shaft 23 which is supported in suitable bearings located in an arm 24. The arm 24 is supported by a pipe shaft 25 for rotary movement in the housings 26 and 27. The housings 26 and 27 are carried by the frame 3. A weight 29 is rigidly affixed to the pipe shaft 25 through an arm 30. The weight 29 functions as a counter balance for the brush assembly to normally maintain the brush unit in elevated position to press the brushes against the chassis of the car. The degree of pressure is varied by varying the amount of the weight. The brush 22 is supported by identically the same parts and like reference numerals have been applied thereto. Rotation of the brushes 20 and 21 is effected from the power shaft 13 through a clutch device 32, and train of gears 33 in gear housing 33' to drive a shaft 34, sprocket 35, chain 36 and sprocket 37, which latter drives the brush shaft 23. Brush 22 is driven in identically the same manner from the power shaft 13 and like reference numerals have been applied to the driving parts for this brush. All moving parts of the machine except the brushes are enclosed in housings to protect them from water, to permit the parts to run in oil and to prevent the possibility of accident from moving parts. The clutch device 32 can be actuated to start and stop the brush units independently of any other parts of the equipment.

Top cleaning mechanism "D"

Further travel of the vehicle with the conveyor subjects the top of the vehicle to the cleaning action of the brush unit D, see Figs. 2, 6, 7 and 8. This unit comprises a rotatably mounted brush including a central section 50, and end sections 51 of progressively enlarged diameter which are supported for rotation with a shaft 52. The end sections 51 are permitted end movement for vehicle bodies of different widths. Springs 53 between stop collars 54 on the shaft 52 and the end brush sections 51 press the end sections toward the central section. Shaft 52 is rotatably mounted in frame arms 54' of a swinging frame which includes a hinge shaft 55. The hinge shaft 55 is rotatably carried by arms 56 which in turn are clamped to a pipe support 57. The swinging frame is supported yieldably by means of a weight 60 through a cord 61 which extends around pulley wheels 62 and is attached to the swinging frame by a collar 63.

The brush is driven in rotation by a motor 64 thru a sprocket 65 which in turn through a chain 66 drives a sprocket 67 rigidly mounted upon the brush shaft 52. A spray device 69 is positioned above the brush to play water or the like upon the brush when desired.

The pressure of the brush upon the top of the vehicle is regulated by regulating the counterbalance weights 60. The brush is set at a height slightly lower than the tops of the vehicles and the vehicles in passing strike the periphery of the brush elevating it and pass under with the brush revolving against the surfaces of the vehicle tops. After the vehicle passes, the brush drops to its original position. For open cars or cars with tops which are not adapted to this type of cleaning the brush is raised out of contact with the car by means of counter-balance cable 61. The cable is pulled down and a cable clamp 70 is hooked under a slotted plate 71 which is affixed to the framework. A drip pan 72 is suitably mounted upon rolls 73 upon the framework so that it can be drawn by means of an operating rod 74 underneath the wet brush to collect the drip of cleaning solution.

Outside wheel washing mechanism

The vehicle after having been subjected to the chassis washing mechanism and to the top washing mechanism is carried by the conveyor A into position to be engaged by the outside wheel washing mechanisms E and F. These machines are duplicates of each other and the same reference numerals will be applied to each machine. When the front wheels of the vehicle reach a position opposite the outside wheel washing units E and F forward movement of the vehicle with the conveyor is stopped for a sufficient length of time for brushes carried by the wheel washing units to engage and clean the outsides of the front wheels. Forward movement of the vehicle is then again permitted until the rear wheels of the vehicles are positioned opposite the wheel washing units E and F. The vehicle rear wheels are engaged and washed by the brushes of the units E and F while the vehicle is held stationary after which the vehicle is released and is carried forward by the conveyor. The wheels of the car are caused to be rotated while the car is stationary due to the forward movement of the conveyor belts whereby the cleansing action of the brushes is facilitated.

The outside wheel washing mechanism E comprises a body portion which is rigidly affixed to the main frame 3', Fig. 2, of the device. The body portion includes a base plate 100, an upright 101 and a supporting hub 102, see Figs. 18, 20, 24 and 28. Suitably mounted upon the body portion is a stop roller W which projects from the body portion out over the conveyor A in the path of the adjoining wheel T of the vehicle to block further forward travel of the vehicle with the conveyor. The roller W is moved laterally slightly by the wheel of the vehicle sufficiently to set the outside wheel washing unit into operation. This causes rotation of a cylindrical cam drum X which is rotatably mounted upon the hub 102. A cam 121, see Fig. 17, upon the cylindrical cam drum X forces a brush unit Y forwardly with respect to the upright 101 a suitable distance such as eight inches into position to engage the outer surface of the wheel. The brush unit in its forward movement forces a gage roller Z forwardly a suitable distance such as twelve inches into position at the rear of the wheel. The brush unit Y is suitably supported in an off centered position with respect to its center of gravity to pivot around its support and thereby force the gage roller laterally into contact with the rear of the wheel. This causes lateral and downward translation of the brush unit Y in accordance with the size of the wheel to permit the brushes to engage the entire outer surface of the wheel, see Fig. 20. Continued rotation of the cylindrical cam drum X after permitting the brushes to engage and clean the wheel for a predetermined time causes a cam to withdraw the brush unit Y to its initial position out of engagement with the wheel, as in Figs. 17, 19 and 23. The brushes engage the wheel during one or more revolutions of the wheel. The brush unit Y withdraws the gage roller Z to its initial position laterally of the conveyor A. Further rotation of the cylindrical cam drum X causes a cam 240 upon the drum X to withdraw the stop roller W a suitable distance such as twelve inches from its position in front of the vehicle wheel thereby releasing the car and permitting the car to be carried forward with the conveyor. Upon continued rotation of the cylindrical cam drum X the stop roller W is released so that it can be pulled outwardly by a weight 247 and laterally into its initial position over the conveyor I to stop the next succeeding wheel traveling along with the conveyor. The cylindrical cam drum X thereupon disengages the clutch 124 connecting the brush unit Y with the source of power 135 and stops the mechanism.

*Stop roller mechanism*

Travel of the vehicle with the conveyor A is stopped when the stop roller W obstructs further passage of the wheel T. As the wheel engages the stop roller it forces the stop roller in lateral pivotal movement through an arc of approximately 75 degrees to the position W' shown in dotted lines in Figs. 17 and 18 before coming to a stop. Lateral movement of the stop roller W initially actuates the cylindrical cam drum X through a portion of a revolution to automatically throw a clutch 124, see Fig. 20, connecting the mechanism with the source of power 135. The stop roller is mounted upon a shaft 107, see Figs. 17, 18 and 19, which in turn is supported by means of bracket 108 and slide bracket 109. Both brackets 108 and 109 are mounted upon a stop roller slide shaft 110 which is supported at its ends by bearings 111 and 112, see Figs. 17 and 19. The lateral movement of the stop roller effects pivotal movement of its supporting brackets 108 and 109 with the shaft 110 as an axis. This causes partial rotation of the shaft 110 and consequently rotation of a gear 115, see Figs. 17 and 18, on the shaft. The driving connection of gear 115 with shaft 110 is effected by means of rollers 116, see Fig. 22, which are positioned in a cam shaped slot 117 in a starting clutch 118 rigidly carried upon the shaft 110. The rotation of the shaft 110 upon lateral translation of the stop roller W locks the rollers 116 against the gear 115 thereby rotating the gear which in turn engages gear teeth 120 upon the circumference of the cylindrical cam drum X to rotate the latter. Rotation of the cylindrical cam drum X brings the low spot of a cam 121, see Figs. 17 and 20, projecting laterally from the periphery of the cylindrical cam drum X into position to engage a cam follower 122.

This operation connects the brush unit E with the source of power in a manner to be now described. The cam follower 122 is connected pivotally to a clutch lever 123 which in turn is connected to a clutch 124, see Figs. 20 and 21. A shaft 125 is rotatably mounted in bearings 126 and 127 which are carried by the base plate 100. A driving sprocket wheel 128 is rotatably mounted upon the shaft 125 and carries a clutch member which is engaged by clutch member 124 after the high spot of the cam 121 passes the cam follower 122. A spring 130 normally forces the clutch members into operative engagement. Clutch member 124 is non-rotatably keyed to the shaft 125. The power is transmitted to the brush cleaning unit E from the conveyor shaft 13, see Fig. 2, through the train of connections 131, 132, 133, 134 and 135. Rotation of the shaft 125 effects rotation of the cylindrical cam drum X through engagement of a gear 136 with the gear teeth 120. Rotation of the cylindrical cam drum by means of gear 136 causes the rollers 116, see Fig. 22, to migrate into the deeper portion of the cam groove 117 thereby permitting idling of the gear 115 upon the shaft 110.

*Brush unit "Y"*

The brush unit Y is normally in withdrawn position from the conveyor as shown in Figs. 17–19. The brush unit is forced outwardly into engagement with the vehicle wheel upon rotation of the cylindrical cam drum X. The brush unit comprises a housing 160 which carries rotatably an intermediate brush 161 by means of a spindle 162 for engaging the hub of the vehicle wheel. Three additional brushes 163, 164 and 165 are positioned circumferentially of the brush 161 and are supported from the housing 160 by means of spindles 167, 168 and 169 respectively. The brush spindle housing 160 is provided with a tubular supporting hub 175 having a closed end 176, as is clearly shown in Figs. 20, 33, 34 and 35. Tubular hub 175 is mounted for horizontal reciprocation on a tubular brush housing arm 177 which is rigidly supported from the supporting hub 102 by means of a bracket 178, see Figs. 20, 24, 25, 26 and 33.

The brushes are driven in rotation by means of a sprocket gear 180 mounted upon the drive shaft 125 as most clearly seen at the right of Fig.

20. The sprocket gear 180 drives a chain 181 and sprocket gear 182 mounted upon a shaft 183 which in turn is rotatably supported within the hub 102. Shaft 183 drives a sprocket gear 184, chain 185, sprocket gear 186, which in turn is keyed to a shaft sleeve 187, see Fig. 33, rotatably mounted within a suitable bearing in the tubular arm 177. A shaft 188 is keyed within the shaft sleeve 187, see Figs. 24 and 33, for longitudinal reciprocating movement and in turn drives a sprocket gear 189. The shaft 188 is held rotatably in and is reciprocated longitudinally by the closed end 176. Sprocket 189 drives a chain 190 which, see Figs. 20, 24 and 33, in turn drives a sprocket gear 191 on the spindle 162 for the central brush 161. Chain 190 similarly drives sprocket gears 193, 194 and 195 together with an idler gear 196. Sprocket gears 193, 194 and 195 rotate the brushes 163, 165 and 164 respectively. Brush 161 is normally inset with respect to brushes 163, 164 and 165 and engages the hub of the wheel to be washed.

The brush unit Y is normally maintained in withdrawn position with respect to the wheel of the vehicle as illustrated in Figs. 18, 19, 33 and 35. The brush unit is forced horizontally into engagement with the wheel of the vehicle, as in Fig. 20, by means of a suitable cam upon the cylindrical cam drum X. The cam aids in maintaining a brush unit in its upper position throughout all but a small portion of each rotation of the cylindrical cam drum. The cam comprises the radially inwardly projecting rib 200, see Figs. 30, 31 and 32, which constitutes the extended portion of the cam and which extends around the periphery of the cylindrical cam drum to the points H and J where the rib inclines laterally to the apex K at the base of the cylindrical cam drum. The apex K constitutes the low spot of the cam. A portion of the rib from H to K is offset laterally at I. A cam follower 204, see Figs. 18, 34, 33 and 35 is forced into the low spot of the cam by means of an angularly shaped projection 201 which is disposed in spaced relation to the rib 200 to form the cam grooves or guideways 202 and 203. The cam follower 204 is carried by the adjacent end of the tubular hub 175 and follows the cam rib 200. At the beginning of the operation of brushing the vehicle wheel, the cam follower 204 is positioned at the low spot K of the cam whereby the brush unit Y is in withdrawn position with respect to the car wheel. Upon initial rotation of the cylindrical cam drum X and actuation of the clutch 124 the cam follower 204 is moved from its position at the apex or low spot K of the cam up the inclined camway past the point I to the point H, thereby causing the brush spindle housing 160 to be pushed toward the wheel of the car. The brush spindle housing 160 is held in this position throughout the rotation of the cylindrical cam drum X until the cam follower 204 reaches the point J whereupon the cam follower is drawn rearwardly down the inclined surface 203 of the camway to the low spot K thus drawing the brush spindle housing 160 away from the wheel of the car. Lateral movement of the chain 190 upon reciprocation of the brush spindle housing 160 is permitted by an elongated slot 205 in the tubular arm 177, see Figs. 25 and 33. A slot 206 in the tubular hub 175 of brush spindle housing 160 permits longitudinal reciprocating movement of the brush spindle housing with respect to the chain 185 as shown in Figs. 20, 33 and 34.

*Brush adjusting mechanism*

The rotary brushes are adjustable laterally and vertically as a unit for cleaning wheels of different diameters. The brush unit is mounted for pivotal movement about the tubular brush housing arm 177, see Figs. 24 and 33. The center of gravity of the brush unit is disposed to the left of the supporting hub as viewed in Fig. 24. For cleaning a wheel of relatively small diameter the brush unit is pivoted to the left and downwardly as shown by light dotted lines 160' in Fig. 24 to center the brushes with respect to the wheel so that the brush 161 engages the hub of the wheel. When cleaning a wheel of relatively large diameter the brush unit is pivoted upwardly and to the right as viewed in Fig. 24, whereby the brushes are centered to clean the larger wheel. The brush unit is held in elevated position while being forced forward and retracted partly by means of the cam follower 204 of the spindle housing 160 which is held in position by the cam grooves 202 and 203, see Figs. 18 and 31. Rotation of the cylindrical cam drum X forces the brush spindle housing 160 outwardly toward the wheel of the car while maintaining the brush spindle housing in its upper position during the first 6¼ inches of its travel in the embodiment illustrated until the cam follower 204 of the brush spindle housing reaches the point I upon the cylindrical cam drum X; see Fig. 31. Meanwhile the gage roller Z has been forced forwardly and pivoted upwardly behind and against the wheel of the car by means of the following arrangement of parts, as shown in Figs. 24 and 35: A rack 215 secured to the hub 175 of the brush spindle housing rotates a pinion 216 as the housing is moved forwardly. The pinion 216 in turn rotates a shaft 217 carried in bracket 218. Shaft 217 rotates a gear 219 which in turn engages a rack 220 on a support 221. The support 221 is slidably mounted upon a supporting shaft 222. The support 221 carries rotatably the gage roller Z by means of a shaft 223 and lever 223'. The gage roller Z is therefore positioned behind the car wheel when the brush unit is initially pushed forward. When the cam follower 204 reaches the point I, as in Fig. 31, the walls of the cam groove no longer support the cam follower and consequently it is permitted to drop in pivotal movement in a counterclockwise direction 160' as viewed in Fig. 24 until the gage roller Z comes in contact with the rear of the vehicle wheel. The brush spindle housing 160 is guided in its pivotal movement by means of a guide roller 225 secured thereto; see Figs. 24, 27, 28 and 29. The guide roller 225 runs in a slot 226 disposed in the upright 101. When operating upon a wheel of relatively small size the guide roller 225 normally assumes the position indicated at P in Figs. 27 and 29, and when operating upon a relatively large sized wheel the guide roller assumes the position indicated at S in Figs. 27 and 29.

As the brush spindle housing 160 drops downwardly, as in Fig. 24, it automatically raises the guide roller Z upwardly into engagement with the rear of the car wheel whereby the brushes are supported in centered position with respect to the car wheel. This elevation of the gage roller Z is effected by means of a gear segment 228 affixed to the tubular hub 175 of the brush spindle housing, see Figs. 24 and 34. The rack 228 engages a rotatably mounted pinion 229 which in turn engages a gear segment 230 upon a support 221. Rotation of the tubular hub 175 therefore turns the support 221 in a counter-clockwise direction as viewed in Fig. 24, thereby bringing the gage roller against the rear of the car wheel. The brushes are therefore lowered and moved forwardly as a unit into position to engage the wheel. A gear segment 230' is rotatably mounted upon supporting arms 231 which in turn support rigidly a gear 233, see Figs. 24, 33 and 35. As the brush spindle housing 160 continues its outward movement of approximately 1¾ inches in the embodiment illustrated toward the car wheel, the gear segment 230' functions as a guide for its forward movement and the gear 233 maintains the brush spindle housing locked in its adjusted position during the brushing operation. The extended portion 200, of the cam maintains the brushes in engagement with the car wheel until the cam follower 204 reaches the position J on the cam. Further movement of the cam draws the cam follower to the right as viewed in Fig. 31, thereby lifting the brush spindle housing 160 upwardly and in pivotal movement in a clockwise direction as viewed in Fig. 24 to its uppermost position where it is maintained while the cam follower is being drawn rearwardly to the low spot K of the cam. Retraction of the brush spindle housing 160 simultaneously withdraws the gage roller Z from its position over the conveyor 1; as in Figs. 17 and 35.

*Stop roller withdrawing mechanism*

The stop roller W is now withdrawn from its position obstructing the path of the car wheel by means of a cam 240 projecting from the periphery of the cylindrical cam drum X. The cam 240, see Figs. 23, 32 and 36, engages a cam follower 241 projecting from the slide bracket 109 and forces the slide bracket to the right as viewed in Fig. 19. A pinion 242 is rotatably mounted in the slide bracket 109 in engagement with a rack 243 on shaft 110 and in engagement also with a rack 244 on the shaft 107, see Figs. 19, 24 and 36. Stop roller W and bracket 108 are moved to the right as viewed in Fig. 19 to a position where the stop roller is disposed out of line with the vehicle wheel. The vehicle is then carried forward by the conveyor 1. The bracket 108 is provided with a guide roller 245 which cooperates with a slot 246, see Figs. 17 and 19, in the base plate 100 which keeps the shafts in a steady position. The stop roller W is now drawn forward into position over the conveyor 1 and also pivoted in a clockwise direction as viewed in Figs. 17, 18 and 24 by means of a weight 247 which is suspended over a sheave 248 by means of a rope 249 which is secured to the slide bracket 109. Meanwhile the cam 121, see Figs. 17, 20, 21 and 30, upon the cylindrical cam drum has arrived at a position to engage the cam follower 122 shifting the clutch 124 and disconnecting the power from the mechanism.

Referring now to Figs. 9 to 16 inclusive, the successive positions of the parts of the outside wheel washing mechanism during the operation of cleaning a wheel are illustrated. Fig. 9 shows the parts in their initial position with the conveyor A bringing the vehicle wheel T into engagement with the stop roller W. Gage roller Z is in withdrawn position with respect to the conveyor A.

Figure 10:
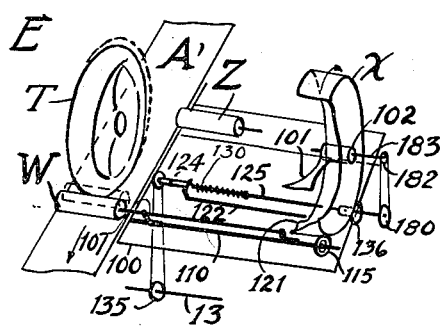

Fig. 10 shows the roller W moved laterally bodily by the vehicle wheel T from dotted line to full line position thereby rotating the shaft 110 and gear 115 to cause rotation of the cylindrical cam drum X in the direction indicated by the arrow. The high spot of cam 121 has been moved laterally from the cam follower 122 thereby permitting the mechanism to be driven from drive shaft 13.

Figure 11:
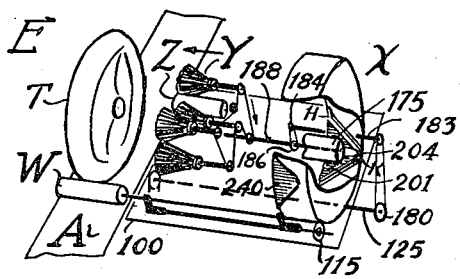
Figure 12:
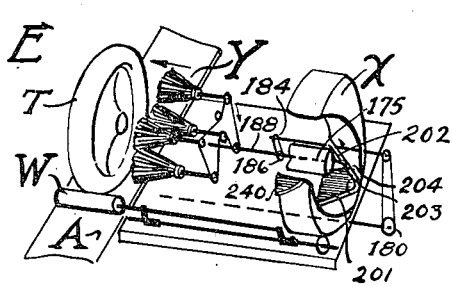

Fig. 11 shows the brush unit Y at the instant of starting rotation of the cylindrical cam drum X, with the cam follower 204 at the apex K of the camway 202. The individual brushes of the brush unit are now revolving in the direction indicated by the arrow. Fig. 12 shows the brush unit Y as it is being forced forwardly toward the vehicle wheel with the cam follower 204 at an intermediate position in the camway 202.

Figure 14:
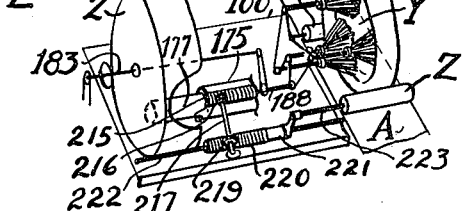
Figure 13:
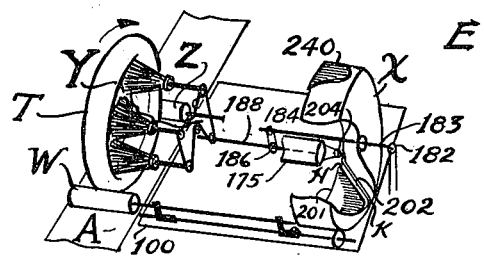

Fig. 13 shows the brush unit Y in its outermost position engaging the vehicle wheel and with the cam follower 204 in engagement with the high spot of the cam 200. The gage roller Z has been moved outwardly over the conveyor A to a position behind and in engagement with the vehicle wheel, thereby centering the brush unit Y with respect to the wheel. Fig. 14 shows the mechanism for moving the gage roller Z into the position just described. The brush unit Y and gage roller Z are subsequently withdrawn to the position shown in Fig. 11.

Figure 15:
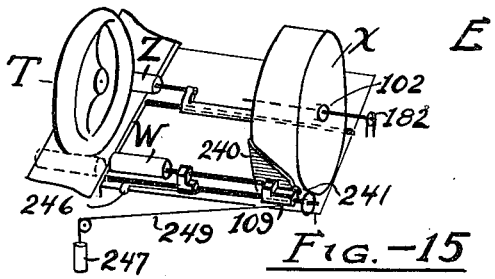

Fig. 15 shows the stop roller W in retracted position with respect to the conveyor to permit the vehicle wheel to be carried forward with the conveyor. The cam follower 241 which is attached to the stop roller mechanism has traveled along the cam 240 to its end position near the base of the cylindrical cam drum. The weight 247 is shown in its elevated position.

Figure 16:
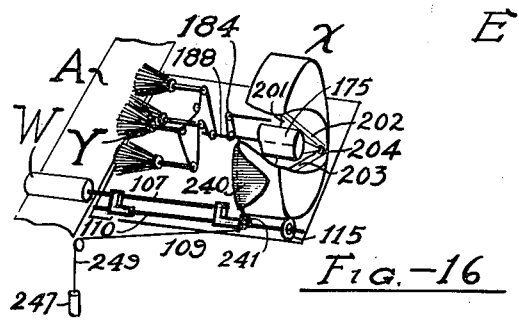

Fig. 16 shows the stop roller W pulled forwardly by the weight 247 in its initial position ready to be engaged by another vehicle wheel.

*Mechanism for cleaning inner side of wheels*

At the same time that the outside wheel washing units E and F are washing the wheels of the car, the inner surfaces of the wheels are washed by the brush units G which comprise rotatably mounted brushes 260 which are carried on shafts 261 and are driven in rotation by suitable gearing 262 through a main shaft 263 which is connected through a train of connections 132 and 131 with the drive shaft 13. These brushes run continually from the same source of power as drives the outside wheel cleaning machines. These brushes are adjustable vertically and laterally. The brush mechanism is entirely enclosed in a water tight housing 264. The brushes also engage portions of the under side of the chassis of the car.

*Top drying mechanism*

After passing the wheel washing mechanism the vehicle is subjected to the action of a brush unit H for drying the top of the vehicle. The brush unit H is identical in all respects with the rotary brush unit D for washing the top except that the drip pan and its operating mechanism are omitted and the chain sprockets have been reversed to obtain a faster speed. Like reference characters have been applied to brush unit H as were applied to brush unit D. The vehicle is carried by the conveyor to a suitable runway at the end of the conveyor where the vehicle is delivered in a clean condition. It will be understood that those parts of the vehicle which have not been mechanically washed are washed by operatives while the vehicle is in transit upon the conveyor.

Various changes may be made within the scope of the appended claims in which it is desired to claim all novelty inherent in the invention as broadly as the prior art permits.

I claim:

1. Vehicle wheel cleaning apparatus, comprising a belt conveyor for supporting a vehicle, means for actuating the conveyor, means for blocking forward movement of the vehicle upon the conveyor while permitting the vehicle wheels to be rotated by the conveyor, rotatably mounted brushes positioned opposite a wheel of the vehicle when the vehicle is stationary, means for engaging the brushes with the sides of the rotating wheel, and means for rotating the brushes.

2. Vehicle wheel cleaning apparatus, comprising a stop roller, means for supporting the stop roller for longitudinal reciprocating movement, a cam drum mounted for rotary movement, means controlled by a cam in the drum for propelling the stop roller forwardly into the path of the vehicle wheel and for withdrawing the roller from the path, a brush unit, means for supporting the brush unit for longitudinal reciprocating movement, and a cam in the drum positioned to propel the brush unit forwardly against the wheel after the stop roller has been forced forwardly and to withdraw the unit from the wheel.

3. Vehicle wheel cleaning apparatus, comprising a stop roller, means for supporting the stop roller for longitudinal reciprocating movement, a cam drum mounted for rotary movement, means controlled by a cam in the drum for propelling the stop roller forwardly into the path of the vehicle wheel, a gauge roller, a brush unit disposed between the stop roller and the gauge roller, means for supporting the gauge roller and brush unit for longitudinal reciprocating movement, a cam in the drum in position to propel the brush unit forwardly against the wheel and the gauge roller forwardly into said path after the stop roller has been forced forwardly, and means associated with the last mentioned supporting means for effecting lateral movement of the gauge roller and brush unit whereby the gauge roller engages the wheel and the brush unit is centered with respect to the wheel.

4. Vehicle wheel cleaning apparatus, comprising a stop roller, means for supporting the stop roller for longitudinal reciprocating movement, a cam drum mounted for rotary movement, means controlled by a cam in the drum for propelling the stop roller forwardly into the path of the vehicle wheel, a gauge roller, a brush unit disposed between the stop roller and the gauge roller, means for supporting the gauge roller and brush unit for longitudinal reciprocating movement, a cam in the drum in position to propel the brush unit forwardly against the wheel after the stop roller has been forced forwardly, means associated with the brush unit for propelling the gauge roller forwardly into said path and means associated with the last mentioned supporting means for effecting lateral movement of the gauge roller and brush unit whereby the gauge roller engages the wheel and the brush unit is centered with respect to the wheel.

5. Vehicle wheel cleaning apparatus, comprising a stop roller, means for supporting the stop roller for longitudinal reciprocating movement, a cam drum mounted for rotary movement, means controlled by a cam in the drum for propelling the stop roller forwardly into the path of the vehicle wheel, a gauge roller, a brush unit disposed between the stop roller and the gauge roller, means for supporting the gauge roller and brush unit for longitudinal reciprocating movement, a cam in the drum positioned to propel the brush unit forwardly against the wheel and the gauge roller forwardly into the path after the stop roller has been forced forwardly, and means connecting the gauge roller and brush unit pivotally in off-centered position for relative pivotal movement toward each other, the cam being cut away to release the brush unit and gauge roller for free pivotal movement at the end of its forward stroke whereby the gauge roller pivots laterally by gravity against the wheel and the brush unit pivots laterally into centered position with respect to the wheel.

6. Vehicle wheel cleaning apparatus comprising a stop roller, means for supporting the stop roller for longitudinal reciprocating movement and in off-centered position for limited pivotal movement about a horizontal axis, a cam drum mounted for rotary movement, means controlled by a cam in the drum for propelling the stop roller forwardly into the path of the vehicle wheel and for withdrawing the stop roller from the path, a source of power, a clutch engaged by the roller on said limited pivotal movement for connecting the source of power to actuate the drum, a brush unit, means for supporting the brush unit for longitudinal reciprocating movement, a cam in the drum positioned to propel the brush unit forwardly against the wheel after the stop roller has been forced forwardly and to withdraw the unit from the wheel, and means for returning the stop roller to its initial pivotal position.

7. Vehicle wheel cleaning apparatus, comprising a belt conveyor for supporting and conveying the vehicle, means for actuating the conveyor, a stop roller, means for supporting the stop roller for longitudinal reciprocating movement, a cam drum mounted for rotary movement, means controlled by a cam in the drum for propelling the stop roller forwardly over the conveyor to block the vehicle wheel whereby the vehicle is held stationary and the wheel is rotated, a brush unit, means for supporting the brush unit for longitudinal reciprocating movement, a cam in the drum positioned to propel the brush unit forwardly against the wheel after the stop roller has blocked the forward travel of the wheel and to withdraw the unit from the wheel, and means for rotating the brushes.

8. Vehicle wheel cleaning apparatus, comprising a conveyor for supporting a vehicle, means for actuating the conveyor, stop mechanism for holding a wheel in a given position longitudinally of the conveyor, a brush unit including brushes for engaging the wheel, and means set in operation by the engagement of the wheel with the stop mechanism for actuating the brush unit.

9. Vehicle wheel cleaning apparatus, comprising a stop mechanism for holding a wheel against longitudinal travel including a member movable laterally by the wheel, a brush unit including brushes for engaging the surface of the wheel, a source of power, and means actuated by the member on lateral movement of the member for connecting the source of power for actuating the brush unit.

10. Vehicle wheel cleaning apparatus, comprising stop mechanism for holding a wheel in predetermined position including a member movable laterally by the wheel, a brush unit including brushes for engaging the wheel, a source of power, means actuated by the member on lateral movement of the member for connecting the source of power for actuating the brush unit, and means for withdrawing the stop mechanism from engagement with the wheel.

11. Vehicle wheel cleaning apparatus, comprising stop mechanism for holding a wheel in predetermined position including a member movable laterally by the wheel, a brush unit including brushes for engaging the wheel, a source of power, means actuated by the member on lateral movement of the member for connecting the source of power for actuating the brush unit, and means including a gauge mechanism for moving the brush unit laterally to centre the brush unit with respect to the wheel.

GUY LYNN ROSEBROOK.